ated Dec. 18, 1973

United States Patent [19]
Stabovitz

[11] 3,779,300
[45] Dec. 18, 1973

[54] MULTIPLE TIRE RIM
[75] Inventor: Peter C. Stabovitz, Woodstock, Ill.
[73] Assignee: Peter C. Stabovitz, Jr., Orangeburg, S.C.
[22] Filed: Apr. 19, 1971
[21] Appl. No.: 135,237

[52] U.S. Cl. ............................................. 152/376
[51] Int. Cl. ............................................. B60c 5/00
[58] Field of Search ........................... 152/376, 362

[56] References Cited
UNITED STATES PATENTS
3,448,783  6/1969  Sons ................................. 152/362
2,918,328  12/1959  Walls ............................. 152/376 X
2,074,284  3/1937  Stevenson ....................... 152/376 X
2,127,075  8/1938  Venosta .......................... 152/376 X Primary Examiner—Gerald M. Forlenza
Assistant Examiner—Jerold M. Forsberg
Attorney—Greist, Lockwood, Greenawalt & Dewey

[57] ABSTRACT

A one-piece unitary substantially cylindrical rim is disclosed for mounting a plurality of concentric tires thereon. In a preferred embodiment, adjacent tires are sealed and supported by removable radially extending flanges on a separator ring. When tubeless tires are used, the adjacent tires are pneumatically interconnected in this preferred embodiment.

2 Claims, 7 Drawing Figures

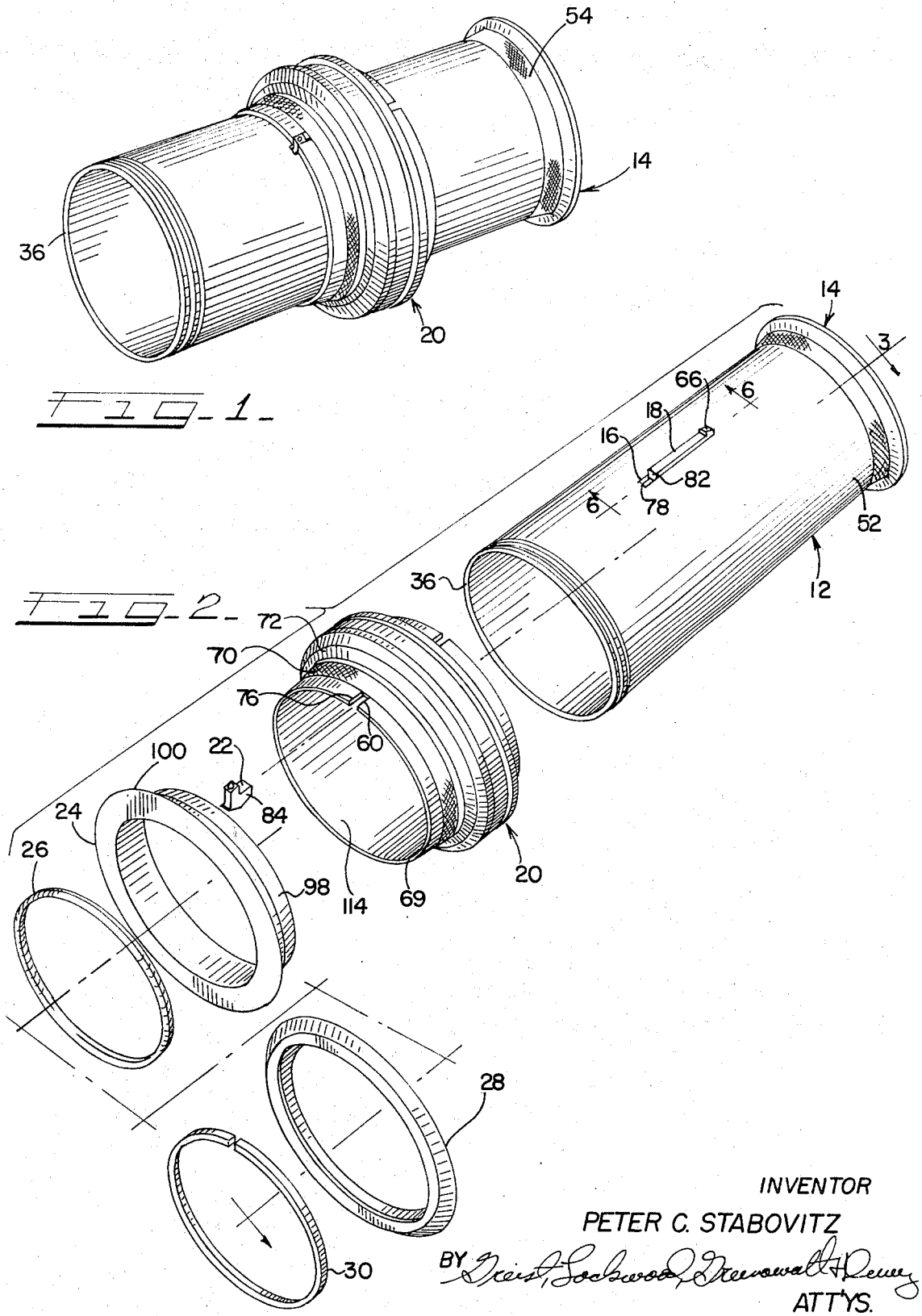

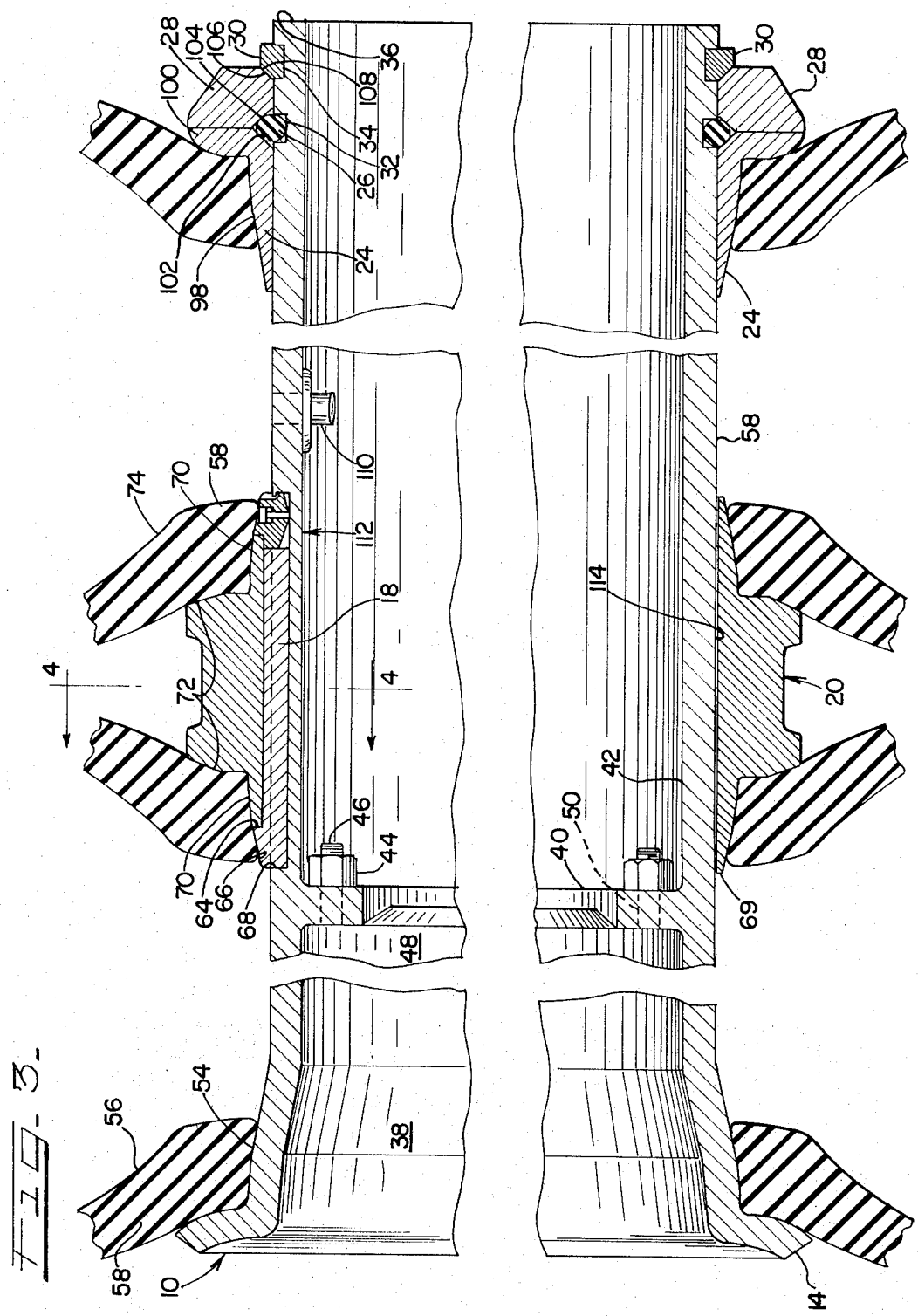

INVENTOR
PETER C. STABOVITZ
ATT'YS.

3,779,300

MULTIPLE TIRE RIM

This invention relates to wheel construction, and more specifically to multiple tire wheels.

This invention provides a one-piece multiple tire rim which is readily adapted to conventional hubs of tractors and other vehicles. The invention provides operating capability for such vehicles in relatively soft ground without adversely affecting handling characteristics of the vehicle.

Multiple tire wheel adapters have been heretofore suggested. Some hub adapters require deeply offset extensions, and virtually all of the adapters have associated therewith the problem of assuring concentricity of the respective tires.

Many tractors and other vehicles are equipped to accomodate accessories such as diggers, loading buckets, blades, lift forks, etc. Consequently the wheel loadings can vary greatly, depending on use and it would be highly desirable to provide for convenient conversion of such vehicle from single-tire wheels to multiple-tire wheels. Also, a particular tractor, or other vehicle, may be assigned to duties from time to time, on hard surfaces, such as concrete roads, loading docks, or warehouses, on relatively firm but fragile surfaces, such as asphalt coated driveways, or on soft ground such as in wet fields, or on unpaved lanes, etc. Although the use of larger tires is generally indicated for equipment which is to be operated on relatively soft ground, or in a region or in a season in which alternating hard and soft terrain is encountered, the attempted accommodation of substantially larger tires to vehicles designed for relatively smaller tires presents serious risks and shortcomings. Attempted installation of larger tires on such equipment would change ground clearance, and probably present interference or other spatial problems with respect to adjacent structural elements such as mud guards and the like. More importantly, a vehicle such as a tractor is designed as an integral operating unit, and performance characteristics depend in part, on the relationship between its gearing and gear ratios, for example, and the diameter of the tires contemplated for use on the vehicle by its designer. Thus, substantially increasing tire diameter to reduce load pressure (loading on the desired operating surface is considered by some to be an undesirable alternative because of the changed operating characteristics which tend to result from the changed drive ratios).

It would be highly desirable to provide a wheel rim which would be readily installed on tractors, and other vehicles, for the purpose of converting the vehicle from a single-tire wheel to a multiple-tire wheel arrangement. It would also be highly desirable to provide such a multiple-tire rim which assures concentricity of the respective tires carried by each respective hub. It would also be highly desirable to provide a multiple-tire rim which is disposed for relatively convenient changing or rotation of tires thereon.

It would also be highly desirable to provide a wheel rim which would permit relatively convenient conversion of tractors, and other vehicles from a single-tire wheel to a multiple-tire wheel arrangement utilizing a plurality of tires having substantially the same diameter as the diameter of tire for which the tractor or other vehicle was designed.

These and other objects and desirable features are all achieved in accordance with this invention in which a plurality of tires are concentrically mounted on a one-piece unitary rim, and separated from each other by a radially extending separator positioned therebetween.

The invention will be described in general and with respect to several preferred embodiments hereinafter with the aid of the accompanying drawings in which:

FIG. 1 is a perspective view of a partially assembled hub of this invention;

FIG. 2 is a perspective exploded view of the components making up a complete hub in accordance with a preferred embodiment of this invention;

FIG. 3 is a cross-sectional fragmentary elevational view taken approximately along the line 3—3 of FIG. 2;

Figure 4:
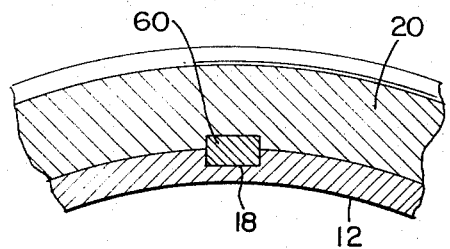
FIG. 4 is a fragmentary cross-sectional view taken approximately along the line 4—4 of FIG. 3.
Figure 5:
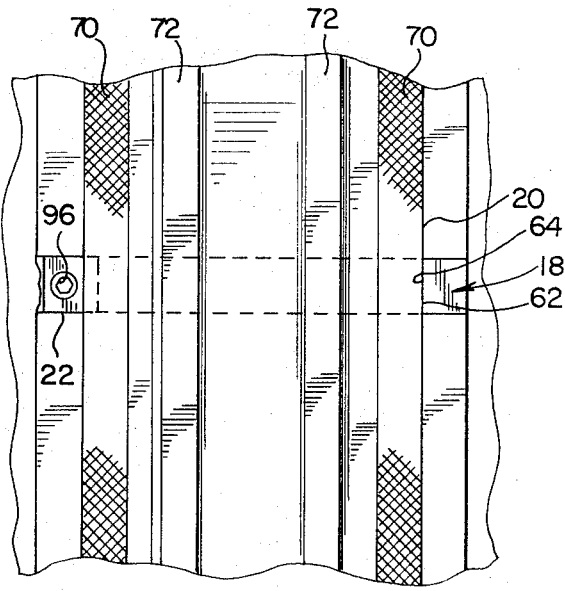
FIG. 5 is an enlarged fragmentary plan view illustrating a portion of the divider ring.

The wheel assembly, generally indicated at 10 in FIG. 3, comprises a unitary one-piece cylindrical rim, generally indicated at 12, having an inside tire-retaining flange 14, a key slot 16, key 18, central spacer ring, generally indicated at 20, key lock 22, outside tire-retaining flange ring 24, sealing ring 26, seal retainer ring 28 and "C" lock ring 30. Seal ring 26 resides in seal recess 32, and "C" lock ring 30 resides in recess 34. Recesses 32, 34 extend around the entire circumference of rim 12 adjacent outer end 36 thereof.

It will be appreciated, particularly from FIG. 3, that rim 12 is of generally cylindrical configuration having a radially outwardly flaring axially inner end portion 38. Integral mounting flange 40 extends radially inwardly from wall 42. Assembly 10 is normally retained on a vehicle (not shown) by means of nuts 44 threaded down against mounting flange 40 over studs 46 which extend from a hub assembly 48. It will be noted that the position of nuts 44, studs 46, is shown schematically, and the spacing of holes 50 on the bolt circle is such that holes 50 register with conventional studs 46.

The radially outer surface 52 of rim 12 includes a 5° tapered portion 54 which is preferably knurled for assuring sealing engagement with tire 56 and, as indicated above, retaining flange 14 bears axially against bead 58 to retain tire 56.

In the following description the respective components or elements and their relationship with one another will be discussed, generally speaking, in the order in which the elements or respective components are encountered in the assembling of wheel 10.

Thus, tire 56 is passed axially over end 36 of rim 14 until bead 58 bears against retaining flange 14. Key 18 is positioned in key slot 16. (One or more keys 18 and key slots 16 can be employed if desired and only one is shown in the illustrations for the purpose of simplifying and clarifying the drawings.) Divider ring 20 is then passed axially over rim 12, and key slot 60, which extends axially across the radially inward face 114 of divider ring 20, is mated axially over key 18 until shoulder 62 bears against radial face 64 of detent 66 on key 18. It will be appreciated that key 18 is restrained against axial movement because it bears against end face 68 of slot 16.

Spacer ring 20 may be considered as a cylinder segment which is bilaterally symmetrical with respect to a radial plane passing through the center thereof which radial plane is parallel to the opposite axial ends 69 of spacer 20. Ring 20 thus includes a pair of oppositely facing tapered knurled portions 70 and radially outwardly extending bead-engaging flange surfaces 72. Thus, one tapered surface 70 and retaining flange 72 is destined to sealingly engage the bead of one tire, and the other tapered surface 70 and retaining flange 72 is destined to engage the bead of a different tire.

Figure 6:
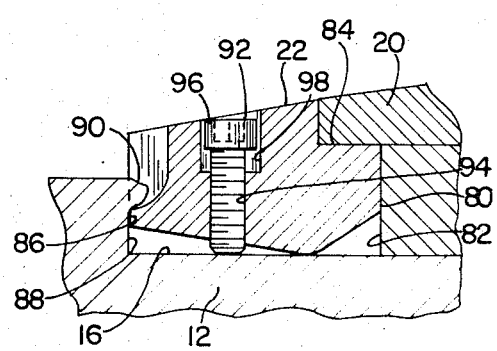
FIG. 6 is an enlarged cross-section view of the assembly as taken along the line 6—6 in FIG. 2 showing the key lock detail.

However, after ring 20 is moved axially inwardly over rim 14 to its extreme position (See FIG. 3), and before a second tire 74 is positioned, key 18, and ring 20 are locked in place by means of key lock 22. Key lock 22 is illustrated in greater detail in FIG. 6. Key lock 22 is inserted through an extending portion 76 of key slot 60 of ring 20 which is positioned radially outwardly of unoccupied portion 78 of key recess 16 (See FIG. 2). One end 80 of key lock 22 engages end face 82, and a portion 84 of key lock 22 extends under divider ring 20 in abutting contact therewith. The other end 86 fits closely against second end face 88 of slot 16. It is preferred that a corner 90 be peened slightly into slot 16 after key lock 22 is positioned as indicated in FIG. 6.

Jack screw 92 is threaded through opening 94 in key lock 22 with head 96 residing in recess 98. Jack screw 96 is used in removing key lock 22 for the purpose of releasing divider ring 20 when it is desired to disassemble the wheel.

After insertion of key lock 22 a second tire 74 is passed axially over outer end 36 of rim 12 bringing bead 58' over key lock 22 and axially facing the outwardly facing flange element 72.

At the outer end 36 conventional slit ring tire-retaining elements can be utilized. For example, outer flange ring 24 includes a knurled tapered portion 98 and radially outwardly extending retaining flange 100. Knurled surface 98 assures sealing engagement with tire 74. After outer retaining ring 24 is positioned as indicated in FIG. 3, resilient sealing ring 26, which is substantially circular in cross section, is expanded and moved axially over outer end 36 of rim 12 and positioned in recess 32. Champfered corner 102 of flange ring 24 bears against sealing ring 26. Retaining ring 28 also has a flange inner corner 104 which bears against sealing ring 26. Retaining ring 28 butts against flange ring 24. Metallic split "C" lock ring 30 is opened sufficiently to pass over end 36 of rim 14 until it can enter recess 34. It is noted that axially outer tapered corner 106 of retaining ring 28 engages axially inner tapered corner 108 of retaining ring 30.

Valve 110 extends radially inwardly from inner face 112 of rim 12. It will be noted that, in the illustrated embodiment, valve 110 provides pneumatic connection with the interior of tire 74 and with the interior tire 56, as well. In the illustrated preferred embodiment inner face 114 of divider ring 20 is in close proximity to outer face 52 of rim 12, but does not provide a pneumatic seal thereagainst. Consequently, the interior region of tire 74 is in pneumatic communication with the interior of tire 56, and thus, pressurization of tire 74 brings about pressurization of tire 56, as well.

In this regard several features which have been implicit in the foregoing description will now be appreciated. It will be appreciated that key slot 16 is merely a recess and does not extend through rim 12. Also, the entire divider 20 is of one-piece unitary construction providing no slots, joints, or other configurations which would permit passage of air from the tire-enclosed region to the atmosphere.

In multiple tire wheel constructions heretofore available the design has been such that sealing elements are provided whereby each of the tires associated with a particular hub is pneumatically sealed, and the associated adjacent tires could not be pneumatically connected to each other. One of the achievements of a preferred embodiment of this invention is the providing of a highly simplified multiple-tire rim, which is simplified by elimination of elements which form barriers to the pneumatic interconnection between the respective tires. Also, by elimination of the requirement that the respective associated tires be pneumatically separated from each other, I have achieved a construction in which the tires are conveniently and readily removed from, and installed on, a multiple-tire rim with automatic concentricity of the respective repositioned tires, associated with a particular hub.

One of the advantages, which I believe to be important, of the pneumatically interconnected multiple-tire embodiment of this invention is the fact that, even though no increase in tire diameter is involved when converting from a single-tire wheel to a multiple-tire wheel arrangement, this invention provides greatly increased reserve gas volume in which to absorb sudden pressure changes associated with localized temporary indentation of a particular tire. By providing an annular gas conduit between the spacer ring 20 and rim 12 immediate pressure equalization is better assured.

The embodiment illustrated in FIGS. 1–6 is illustrative of a most preferred embodiment of this invention, and it is to be understood that one with ordinary skill in the art, given the disclosure of this invention, can provide a number of modifications and structural changes without departing from the scope or spirit of the invention. For example, in the illustrated preferred embodiment, a tubeless-tire configuration is shown. In such an embodiment a single valve provides means of pressurizing both tires. However, the invention can be used as well with tires having inner tubes, in which instance suitable opening (not shown) is provided in rim 14 for passage of the valve stem equivalent to valve 110 therethrough. In such an embodiment, however, sealing ring 26 is not essential.

Figure 7:
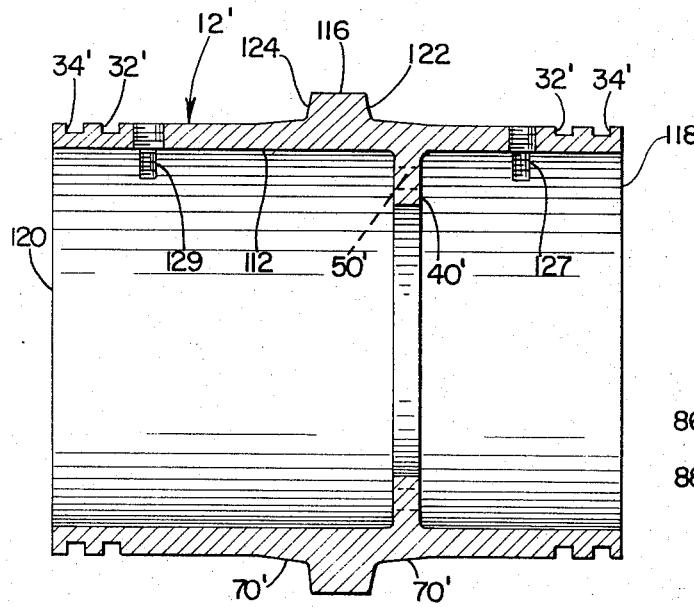
FIG. 7 is a mid-section view as in FIG. 3 showing an alternative construction.

An alternative embodiment of the present invention is suggested in FIG. 7. In the embodiment shown in FIG. 7, it will be apparent that numerous portions or elements are similar to those shown in the heretofore-discussed embodiment. Consequently these elements will not be described again in detail and these elements will be identified by primed numbers corresponding to the number of the similar structures referred to hereinabove.

In the embodiment illustrated in FIG. 7, however, rim 12' includes integral spacer flange 116 positioned approximately medially between inner end 118 and outer end 120. Spacer flange 116 has oppositely facing bead-engaging faces 122, and 124, respectively. The tire-retaining means used with rim 12' are substantially identical to those illustrated hereinbefore adjacent end 36 of rim 12. In the embodiment illustrated in FIG. 7, it will be appreciated that the regions enclosed by the respective tires are pneumatically separate and are not interconnected, and that valve elements 127, 129 must be provided for each tire (not shown).

Thus, in the embodiment illustrated in FIGS. 1-7 a plurality of tires are positioned around an integral unitary cylindrical rim passing therethrough, and each of the tires are separated from each other, sealed, and maintained in proper concentric operating configuration by a spacer ring 20 therebetween. The spacer ring is secured against rotation with respect to rim 12 by a key 18. Key 18 and key lock 22 also provide, in cooperation with key recess 16 means for preventing axial displacement of spacer ring 20. Although provision for a pair of tires is shown in the illustrated embodiments, a plurality of tires including two, three or more can be mounted providing an appropriate number of spacer rings 20 are utilized.

I have found that tractors, loaders, vehicles, and the like can be operated on relatively wet ground by substituting the multiple-tire wheel of this invention for a conventional single-tire wheel commonly supplied with such vehicles, and this substitution provides substantially all the advantages of operating such vehicles with relatively larger diameter tires. In the use of the invention I prefer to use older and slightly worn tires (therefore having slightly smaller diameter) as outside tires 74 and relatively newer tires as inside tires 56. With such an arrangement, the inside tire 58 is, in the illustrated embodiment, positioned over mounting flange 40, carrying virtually all of the weight when the tractor or other vehicle is operated on relatively hard ground. On soft ground, however, the larger inner tire 56 sinks into the soft ground or mud and the weight is then distributed between both tires 56, 74. However, when the vehicle is to be assigned to use on fragile paved surfaces such as black top, it is preferred that adjacent tires be of exactly the same degree of wear.

Also, since a number of tires of substantially the same diameter are utilized, rather than a tire having a much greater diameter, for the purpose of operating a vehicle in soft ground, the operating characteristics of the vehicle are not substantially changed. While it is not intended that the invention be limited by any theories, it is believed that the gear ratios of the vehicle are optimized with respect to a particular tire diameter, and providing a plurality of tires does not adversely affect the operating characteristics of the vehicle, whereas substitution of a larger tire for the purpose of greater buoyancy and operating capability in soft ground, would adversely affect the operating characteristics of the vehicle. It is also contemplated that, in an alternative embodiment, rims utilizing a removable separator ring 20 be provided also, at both the inner and outer ends of the rims, with removable tire-retaining elements such as, for example, rings 24, 28, 30, and recesses 32, 34 which are illustrated adjacent to outer end 36 in the embodiment illustrated in FIGS. 1–6 herein.

As used herein, the term "substantially cylindrical," as used with respect to the rim element 12 is intended to include integral rim elements having substantially circular cross section, in which all the respective cross sections have radii of equal length as well as those rim elements having circular cross sections in which the respective cross sections have radii of different length. In the embodiment illustrated in FIG. 7, all circular cross sections of rim 12' have equal radii, whereas in the embodiment of FIGS. 1–6, the radii of all circular cross sections of rim 12 are not of equal length because of the outwardly flaring end portion 38.

I claim:

1. A multiple tire vehicle wheel assembly for concentrically mounting a plurality of pneumatic tires thereon, comprising: a substantially cylindrical tire-supporting rim element, said rim element being of integral, unitary construction and being sufficiently elongated for mounting a plurality of tires thereon; removable end-retaining means for retaining tires on said rim element, said end-retaining means being positioned adjacent to an axial end of the rim element; removable spacer means for positioning between and spacing apart respective adjacent tires, said removable spacer means extending radially outwardly of said rim element, said spacer means including means for forming a pneumatic seal between itself and respective tires immediately adjacent thereto, said spacer means being of integral unitary annular construction; mounting means for mounting said wheel assembly on a vehicle; lock means for restraining said spacer means from rotation with respect to said cylindrical rim element, and from motion in an axial direction along said rim element; said lock means also including key means residing between said rim element and said spacer means, in a recess in said rim element and in a recess in said spacer means, and wherein said rim element, and said spacer means provides a gas conduit therebetween which pneumatically joins adjacent tires.

2. A multiple-tire vehicle wheel assembly for concentrically mounting a plurality of pneumatic tires which have mounting beads thereon, comprising: a substantially cylindrical tire-supporting rim element, said rim element being of integral unitary construction and being sufficiently elongated for mounting a plurality of tires thereon at a position at which all the beads are located axially within the end of the integral rim element; said assembly including end-retaining means for retaining said tires on said rim element, said end-retaining means being adjacent respective axial end of the rim element, at lease one of said end-retaining means including a separate releasable annular member positioned radially outwardly of said rim element and axially within the respective end of said rim element; separate removable spacer means for positioning between and spacing apart respective adjacent tires, said removable spacer means extending radially outwardly of said rim element, said spacer means including means for forming a pneumatic seal between itself and its respective tire immediately adjacent thereto, said spacer means including an annular member being of integral unitary construction; said assembly including lock means for restraining said spacer means from rotation with respect to said cylindrical rim element, and from motion in an axial direction along said rim element; and mounting means for mounting said wheel assembly on a vehicle; wherein said lock means includes key means residing between said rim element and said spacer means, in a recess in said rim element and in a recess in said spacer means, and wherein said rim element, and said spacer means, provides a gas conduit therebetween which pneumatically joins adjacent tires.

* * * * *